United States Patent
Murawski et al.

[11] Patent Number: 6,139,268
[45] Date of Patent: Oct. 31, 2000

[54] TURBINE BLADE HAVING AN EXTENSIBLE TAIL

[75] Inventors: Christopher G. Murawski, Beavercreek; Rolf Sondergaard, Fairborn, both of Ohio

[73] Assignee: The United States of America as represented by the Secretary of the Air Force, Washington, D.C.

[21] Appl. No.: 09/272,491

[22] Filed: Mar. 19, 1999

[51] Int. Cl.[7] .......................................... F01D 5/00
[52] U.S. Cl. .................. 416/23; 416/87; 415/914
[58] Field of Search ..................... 415/914, 119; 416/3, 23, 24, 87; 244/204, 212, 213, 215, 216

[56] References Cited

U.S. PATENT DOCUMENTS

| | | |
|---|---|---|
| 3,721,406 | 3/1973 | Hurlbert ................................ 244/42 D |
| 3,966,352 | 6/1976 | White et al. . |
| 4,563,970 | 1/1986 | Walker ..................................... 114/103 |
| 5,806,302 | 9/1998 | Cariola et al. . |

*Primary Examiner*—Edward K. Look
*Assistant Examiner*—Rhonda Barton
*Attorney, Agent, or Firm*—Richard A. Lambert; Bobby D. Scearce; Thomas L. Kundert

[57] ABSTRACT

A turbine blade having an extensible tail is described. The extensible tail is selectively positionable during engine operation, enabling fine-tuning for maximum power and efficiency during engine operation. During periods of operation exhibiting low Reynolds number flows, the extensible tail is projected out from the trailing edge of the turbine blade, into the gas path. As Reynolds number flows increase, the extensible tail is retracted back into the turbine blade, maximizing turbine engine efficiency.

4 Claims, 1 Drawing Sheet

TURBINE BLADE HAVING AN EXTENSIBLE TAIL

RIGHTS OF THE GOVERNMENT

The invention described herein may be manufactured and used by or for the Government of the United States for all governmental purposes without the payment of any royalty.

BACKGROUND OF THE INVENTION

The present invention relates generally to gas turbine engines, and more specifically, to a turbine blade having an extensible tail.

The desirability of providing fuel efficient gas turbines is well known. Clearly, the fuel efficiency of a gas turbine directly impacts operating costs. In the case of gas turbine engines used in aircraft, the benefits of providing fuel efficient engines are reduced operating costs, increased engine performance and increased range, since the aircraft is capable of flying farther on the same amount of fuel.

Generally, gas turbine engines include, at a minimum, a compressor section, a combustor, and at least one turbine section. During operation, ambient air enters the compressor section where it is pressurized and subsequently discharged to the combustor to be mixed with fuel and ignited. The hot gasses thus generated are directed into the turbine section whereupon some of the energy therein is extracted by the turbine blades. After passing through the turbine section, the gasses are exhausted from the engine. In this manner, a significant amount of thrust for propulsion of the aircraft is generated. Moreover, the turbine blades are designed to impart a rotational force to the rotor upon which they are attached. This rotational force is utilized to impart the requisite energy to the compressor section to continuously compress the ambient air in order to maintain the operation of the gas turbine engine.

Gas turbine engine configurations can vary. For example, a fan section can be placed upstream of the compressor section. The turbine can have more than one rotor shaft. The turbine can include several rows of turbine blades of increasing size in order to extract more energy from the combustion gas divided into high pressure and low pressure sections. In this way, gas turbine configurations are varied, depending on the desired performance and operational characteristics expected to be encountered in service.

As can be appreciated, the operating environment that a gas turbine engine used on aircraft is exposed to varies markedly. For example, the airflow through the engine varies with the throttle position selected by the pilot as well as altitude. Thus, while gas turbine designs are chosen carefully in order to maximize operational output, the final design is chosen in light of the entire range of operating conditions expected to be encountered by the aircraft in flight. As expected, this can result in operational compromises that while not catastrophically impacting the operation of the aircraft, are not without the need for improvement.

A number of attempts to improve the performance of gas turbines by varying nozzle area have been made to date. Many are directed to varying the nozzle inlet area in the turbine section. See, for example, U.S. Pat. No. 3,966,352 to White et al. See also, U.S. Pat. No. 5,806,302 describing a variable fan exhaust nozzle for tailoring the exit throat area of the fan air stream to specific conditions encountered in flight.

While not unsuccessful, the various prior art attempts have need for improvement. More specifically, it has been determined that the configuration of the turbine blades themselves sometimes contribute to a degradation in performance. This is because the turbine blades are designed for extracting energy from the combustion gasses over the entire range of expected operating conditions. As a result, the configuration of the blade thus represents a degree of compromise in order to provide the best performance overall. More specifically, turbine blade performance may actually be reduced in certain, transient operating conditions experienced by the aircraft in favor of overall performance. This reduction in performance is due, at least in part, to the development of zones of undesirable flow characteristics along the surface of the turbine blade. These undesirable flow zones can arise from the negative effects of unpredictable transition zones existing between areas of laminar and turbulent flow, or they can arise from the separation of boundary layer flow giving rise to separation zones or bubbles. In either case, these undesirable flow zones can become quite large, increasing fuel consumption as well as lowering engine performance.

A need exists therefore for an improved turbine blade exhibiting desirable performance characteristics throughout the operating range of the turbine engine.

It is therefore a primary object of the present invention to provide a turbine blade displaying optimal performance characteristics throughout the expected operating conditions of the turbine engine.

It is another object of the present invention to provide a turbine blade having an extensible tail to control the extent of undesirable flow zones across the blade.

It is still another object of the present invention to provide a turbine blade displaying smaller undesirable flow zones during turbine operation.

These and other objects of the invention will become apparent as the description of the representative embodiments proceeds.

SUMMARY OF THE INVENTION

In accordance with the foregoing principles and objects of the invention, a turbine blade having an extensible tail is described. As is known in the art, turbine blades include an airfoil section having a leading edge, a trailing edge, a generally concave pressure side disposed therebetween, and a generally convex suction side spaced from the pressure side. Advantageously and as will be described in more detail below, the extensible tail of the present invention is retractably positionable beyond the trailing edge of the turbine blade and provides for a dynamic tuning effect to the operation of the turbine engine, optimizing performance throughout the entire range of operating conditions.

Turbine blades are fabricated from metallic alloys for strength, durability and resistance to the high operating temperatures encountered in the gas turbine. The cross-sectional area, shape as well as size of the blades is determined according to the expected operating conditions of the turbine engine. As can be appreciated, the design process can lead to compromises of performance of the turbine engine at certain narrow ranges of speed, loading, etc., because the blades are designed to be efficient across the entire range of operating conditions. In other words, the overall blade shape is arrived at by an averaging process allowing inefficiencies at certain operating parameters in exchange for overall effectiveness.

These inefficiencies often arise as a result of the nature of flow of the gas along the turbine blade. Depending on engine operating conditions, the flow of combustion as within the engine varies markedly. The change in flow can lead to undesirable gas path dynamics, especially on the convex suction side of the turbine blade. This reduction in performance is due, at least in part, to the development of zones of undesirable flow characteristics along the surface of the turbine blade. Depending on turbine blade configuration, these undesirable flow zones can arise from the negative effects of unpredictable transition zones existing between areas of laminar and turbulent flow, or they can arise from the separation of boundary layer flow giving rise to separation zones or bubbles. In either case, these undesirable flow zones can become quite large. The net result is a disadvantageous degradation in performance. Depending on the aircraft, this performance degradation can be significant.

Simply for purposes of illustration, the zones of undesirable flow will henceforth be described in terms of flow separation. It shall be understood, however, that the turbine blade having an extensible tail of the present invention produces equally effective results when the undesirable flow zones are comprised of areas of transition flow.

Advantageously, and according to a significant aspect of the present invention, the extensible tail of the turbine blade can be selectively projected into the gas path during times of flow separation and retracted at other times. For example, during periods of operation requiring maximum power, such as during take-off, the extensible tail would be retracted. Conversely, the tail would be extended during periods of operation which typically exhibit large separation regions such as during high altitude cruise. This causes the disadvantageous effects of flow separation to be reduced or even eliminated by causing the separation zone to decrease in size or even disappear altogether. Thus, the turbine blade of the present invention provides an effective, dynamic capability to fine-tune the turbine engine, assuring optimum efficiency throughout the entire range of turbine operation.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
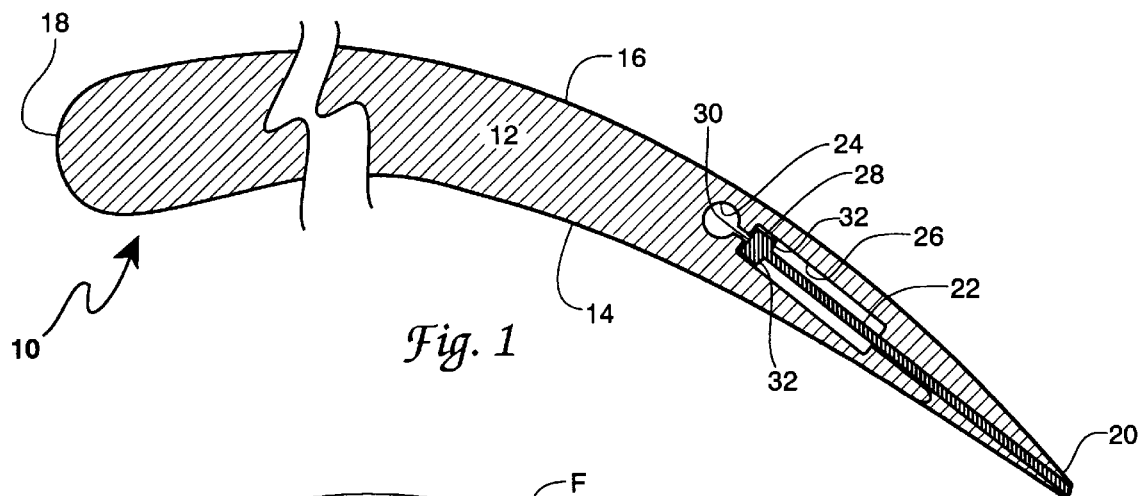
FIG. 1 is a cross sectional view of the turbine blade of the present invention.

Reference is made to FIG. 1 showing a cross sectional view of the turbine blade having an extensible tail of the present invention. As is known in the art, the turbine blade 10 includes an airfoil shaped body 12 formed by concave pressure side 14, a convex suction side 16, a leading edge 18 and a trailing edge 20.

As is known, the cross-sectional area, shape and size of the blades is determined according to the expected operating conditions of the turbine engine. As can be appreciated, the design process can lead to compromises of performance of the turbine engine at certain narrow ranges of speed, loading, etc., because the blades are designed to be efficient across the entire range of operating conditions. In other words, the overall blade shape is arrived at by an averaging process, allowing inefficiencies at certain operating parameters in exchange for overall effectiveness.

Advantageously, and according to an important aspect of the present invention, the turbine blade 10 includes an extensible tail 22. As will be described in more detail below, the tail 22 is selectively positionable during engine operation. This provides a means for varying the blade aspect ratio which is defined as blade pitch divided by axial chord length. By projecting the extensible tail 22 beyond the trailing edge 20 of the turbine blade 10, the gas path dynamics across the blade can be fine-tuned for maximum power and efficiency during engine operation.

The turbine blade 10 further includes a plenum chamber 24 in outlet fluid communication with a reaction chamber 26 housing the extensible tail 22. The extensible tail 22 is slidably retained within the reaction chamber 26. The extensible tail 22 includes an enlarged head 28 formed integrally therewith. The enlarged head 28 has first and second surfaces 30 and 32 respectively. During operation, the plenum chamber 24 can be pressurized by the introduction of a pressurized fluid such as, for example, pressurized air obtained from the compressor section of the gas turbine. The pressurized fluid is directed against the first surface 30 of the head 28, and when sufficient, the extensible tail 22 is urged in an outward direction, away from the trailing edge 20 and into the gas path during turbine operation. Conversely, when a retraction of the extensible tail back into the turbine blade 10 is desired, pressurized fluid can be introduced into the reaction chamber 26, directed against the second surface 32 of the head 28, urging the extensible tail inwardly, providing a retraction thereof. A spring or other biasing means not shown can also be utilized to provide the force for retracting the extensible tail 22. Thus, the plenum chamber 24, the reaction chamber 26 and the enlarged head 28 of the extensible tail 22, combine to form an actuator for retractably positioning the extensible tail 22 into and out of the turbine blade of the present invention 10. It should be appreciated, however, that the actuator can utilize other forms of actuation such as pneumatic, mechanical, piezoelectric, magnetic, etc., without departing from the spirit of the present invention.

As is known to those skilled in the art, the gas flow within the turbine engine during operation is sometimes described in terms of Reynolds numbers. Reynolds numbers are dimensionless and provide a convenient, shorthand way of describing gas flow conditions. For gas turbine applications, the Reynolds number can be defined as:

$$Re = \frac{U_{OUT}(C)}{v}$$

where $U_{OUT}$ is the average gas velocity out of the blade set, C is the axial chord of the turbine blade, and v is the kinematic velocity.

Figure 2:
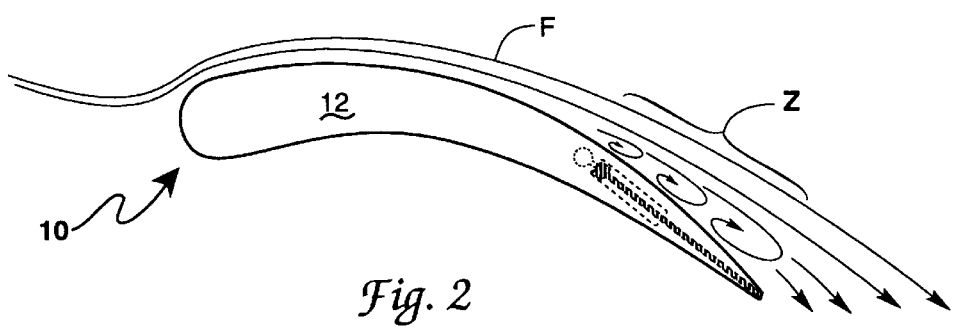
FIG. 2. is an elevational view of the turbine blade of the present invention; and, FIG. 3 is an elevational view of the turbine blade of the present invention, showing the extensible tail in an extended position.

During turbine engine operation, Reynolds numbers can vary widely. Turbine power level settings and aircraft altitude are significant factors on the flow Reynolds number within the engine. As Reynolds numbers change, the effect on the turbine engine, especially on the low pressure section can be quite dramatic. More specifically, as Reynolds numbers drop, undesirable areas of flow separation increase dramatically in size. Reference is now directed to FIG. 2 illustrating flow lines F across the turbine blade 10 during low Reynolds number operation. As shown, the flow lines F have separated from the turbine blade 10 creating a separation zone Z. As separation zones Z increase in size, engine performance degrades accordingly. Depending on factors such as blade size, location within the turbine, engine power levels as well as aircraft altitude, the decrease in performance can be substantial.

Figure 3:
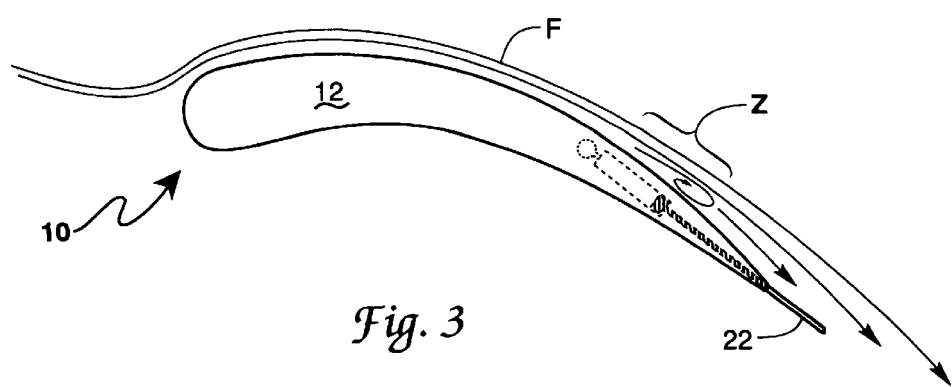

Reference is now made to FIG. 3 showing the flow lines F across the turbine blade 10 when the extensible tail 22 is extended. As can be seen, the separation zone Z decreases dramatically in size. This correspondingly results in increased turbine engine efficiency and improved aircraft performance.

In summary, numerous benefits have been described from utilizing the principles of the present invention. The turbine blade of the present invention 10 includes a retractably positionable extensible tail 22. During turbine engine operation, the extensible tail 22 can be projected during periods of low Reynolds number flows in order to substantially reduce or perhaps even eliminate undesirable flow zones. When Reynolds numbers increase, the extensible tail 22 is retracted back into the turbine blade 10. In this way, the operation of the turbine engine can be fine-tuned, advantageously providing enhanced, more efficient aircraft operation.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

We claim:

1. A turbine blade, comprising:

an airfoil shaped body, said body having a convex side, a concave side, a leading edge and a trailing edge;

an extensible tail for selectively varying turbine blade aspect ratio retractably retained within said body, said tail being extensible beyond said trailing edge; and, an actuator including an enlarged head portion for retractably positioning said extensible tail, said enlarged head formed integrally with said extensible tail, said enlarged head directly responsive to fluid pressure.

2. The turbine blade of claim 1 wherein said actuator includes a plenum chamber within said body in fluid communication with a reaction chamber within said body.

3. The turbine blade of claim 2 wherein said enlarged head of said extensible tail is slidably retained within said reaction chamber, said head having first and second surfaces for engagement with pressurized fluid within said reaction chamber.

4. The turbine blade of claim 3 wherein said fluid is pressurized air.

* * * * *